3,250,792
19-NOR-STEROIDS AND PROCESS FOR THEIR MANUFACTURE
Albert Wettstein, Riehen, and Georg Anner, Karl Heusler, Jaroslav Kalvoda, and Peter Wieland, Basel, Switzerland, assignors to Ciba Corporation, New York, N.Y., a corporation of Delaware
No Drawing. Filed July 9, 1962, Ser. No. 208,634
Claims priority, application Switzerland, July 14, 1961, 8,270/61; Dec. 29, 1961, 15,169/61, 15,171/61
14 Claims. (Cl. 260—397.1)

The present invention provides a special process for the manufacture of $\Delta^{4:6}$- and $\Delta^{5(10),6}$-3-oxo-19-nor steroid-dienes starting from $\Delta^{4:6}$-3-oxo-19-hydroxy-steroid compounds.

The products obtained by the present process are pharmacologically active or are intermediates for the manufacture of pharmacologically active products. Thus the 6-dehydro-derivatives of 19-nor-testosterone and 19-nor progesterone and their substitution products exhibit androgenic-anabolic and gestagenic actions respectively. A gestagenic action is sometimes also shown by representatives of the androstane series: thus, for example, 6-dehydro-17α-ethyl-19-nor-testosterone, more especially in the form of its esters, has a strong gestagenic effect (see U.S. specification 2,874,170). The $\Delta^{4,6}$-3:20-dioxo - 17α-hydroxy-19-nor-pregnadienes and their esters are efficient oral progestatives. There should be particularly mentioned $\Delta^{4:6}$-3:20-dioxo - 17α - acetoxy-19-nor pregnadiene and the corresponding 4-chloro- and 6-chloro-derivatives which are particularly efficient in this respect and free from side effects. When administered perorally the $\Delta^{4:6}$-17α-acetoxy-19-nor-3:20-pregnadiene i.e. is 10 times as effective as ethisterone. The $\Delta^{5(10),6}$-3:20-dioxo-19-nor-pregnadienes and their substitution products, such as, for instance $\Delta^{5(10),6}$-3:20-dioxo-17α-acetoxy-19-nor-pregnadiene are also progestatives, while the $\Delta^{5(10),6}$-3-oxo-17β-hydroxy-19-nor-androstadienes exhibit anabolic and androgenic action and in some derivatives having a 17α-alkyl group also progestative action.

The $\Delta^{4:6}$-3-oxo-19-nor-streoids manufactured according to the invention are also valuable intermediates for the synthesis of the known biologically highly active $\Delta^{4}$-3-oxo-19-nor-streoids with saturated 6-position more especially those of the androstane and pregnane series. Thus, 19-nor-testosterone and its esters are of special therapeutical importance as anabolics, and 19-nor-17α-methyl, -ethyl, vinyl and -ethinyl-testosterone and also 19-nor-progesterone as gestagens.

According to the new process $\Delta^{4:6}$-3-oxo-19-hydroxy-steroid dienes are oxidized to corresponding steroid-19-acids which are then decarboxylated by heating and any $\Delta^{5(10),6}$-3-oxo-19-norsteroid diene is isomerized, if desired, to a $\Delta^{4:6}$-3-oxo-19-norsteroid diene by a method known in the art for isomerizing $\Delta^{5(10)}$-3-oxo-19-nor-steroids to $\Delta^{4}$-3-oxo-19-nor-steroids, and, if desired, the $\Delta^{4:6}$-3-oxo-19-nor-steroids obtained are halogenated to obtain the 4-halogen derivatives or treated with a peracid to obtain the $\Delta^{4}$-3-oxo-19-nor-6:7-oxido-steroids, these compounds are converted by the aid of a hydrohalic acid into 6-halogeno-7-hydroxy compounds which are then treated with a sulfonylating agent and the resulting 6-halogeno-7-sulfonyloxy compound is treated with a basic agent.

Oxidizing agents preferably used in the manufacture of the steroid-19-acids are compounds of hexavalent chromium, such as chromium trioxide, and they are used in a solvent that is inert towards the oxidizing agent, for example acetone, and advantageously in the presence of a strong acid, such as sulfuric acid.

Alternatively, the oxidation of the 19-hydroxy compound to the 19-acid may be performed in stages. Thus, oxidation with chromium trioxide in pyridine as solvent furnishes the new $\Delta^{4:6}$-3:19-dioxosteroid dienes which are likewise oxidized to the steroid-19-acids, for example in acetone with chromium trioxide+sulfuric acid.

The decarboxylation of the $\Delta^{4:6}$-3-oxosteroid diene-19-acids is carried out by heating, if desired, in an acidic, basic or neutral solvent. Solvents suitable for the decarboxylation under acidic conditions are polar solvents that are inert towards acids, for example alcohols, more especially lower aliphatic alcohols such as methanol, ethanol, n-propanol, n-butanol or n-amyl alcohol, or preferably tertiary alcohols such as tertiary butanol or tertiary amyl alcohol. Suitable acids are, for example, mineral acids such as hydrohalic acids, sulfuric or perchloric acid, or organic acids such as formic or para-toluenesulfonic acid. It has been found that the decarboxylation can be performed in a particularly advantageous manner by heating the starting materials for a short time in a lower aliphatic carboxylic acid, such as formic, acetic, propionic, methoxyacetic, chloracetic acid or the like; this treatment does not affect any readily hydrolyzable groups present such, for example, as acyloxy groups. The elimination of carbon dioxide is generally performed at an elevated temperature ranging, for example, from 50 to 100° C., preferably at the boiling point of the solvent used. Under the afore-mentioned acidic conditions the $\Delta^{4:6}$-3-oxo-19-norsteroid dienes are obtained directly as final products.

The decarboxylation in a basic medium is performed with special advantage with a tertiary organic base such, for example, as pyridine, collidine, a dialkylaniline, for example dimethylaniline, or the like. The reaction temperature is preferably within the range of 50 to 100° C.

The decarboxylation can alternatively be performed without addition of an acid or a base by heating the starting materials, if desired in a suitable neutral solvent, such as: aliphatic, alicyclic, aralyphatic or aromatic hydrocarbons such, for example, as heptane, octane, dimethylcyclohexane, decahydronaphthalene, xylene, cumene, or para-cumene or preferably in toluene. The reaction according to the invention can equally well be carried out in other solvents such, for example, as high-boiling ethers such, for example, as dioxane, methyl ethers of ethylene glycol or polyethylene glycol, in substituted benzenes such as chlorobenzene, nitrobenzene, anisole, in dialkylamides such as dimethyl formamide or dimethyl acetamide. The elimination of carbon dioxide generally takes place at a temperature ranging from 90 to 150° C.

When the decarboxylation is conducted under neutral or weakly basic conditions, the $\Delta^{5(10),6}$-3-oxo-19-nor-steroid dienes are obtained which can be isomerized in known manner to the $\Delta^{4:6}$-3-oxo-19-norsteroid dienes. Particularly suitable for the isomerization are the aforementioned acidic agents, or inorganic bases, for example alkali metal acylates, such as sodium acetate or potassium acetate, or carbonates or bicarbonates of alkali metals, for example lithium, sodium or potassium carbonate, or sodium bicarbonate and potassium bicarbonate, as well as alumina.

The $\Delta^{4:6}$-3-oxo-19-norsteroids obtained by the methods described above are, if desired, halogenated by treatment with a halogen, preferably bromine or chlorine, in a suitable solvent, such as a lower aliphatic carboxylic acid, at a low temperature and any dihalogenated derivative formed is dehydrohalogenated e.g. with a tertiary base such as collidine or pyridine or thermally to give the 4-halogen derivatives, e.g. the 4-chloro- or 4-bromo-$\Delta^{4:6}$-3-oxo-19-norsteroids of the pregnane or androstane series.

The $\Delta^{4:6}$-3-oxo-19-norsteroids obtained may however also be converted to 6-chloro derivatives thereof by converting them into $6\alpha:7\alpha$-epoxides of corresponding $\Delta^4$-3-oxo-19-nor-steroids and then into 6-halogen-7-hydroxy-$\Delta^4$-3-oxo-19-nor-steroids treating these compounds with a sulfonylating agent and splitting off the sulfonyloxy group of the formed 7-sulfonyloxy-6-halogeno-compounds with a basic agent. The $6\alpha:7\alpha$-epoxides are formed in the customary manner by the aid of an organic peracid, e.g. perphthalic or perbenzoic acid. The treatment with a hydrohalic acid, e.g. hydrochloric, hydrofluoric or hydrobromic acid is effected under mild conditions and advantageously at low temperatures, for example, ranging from $-20$ to $+30°$ C., and in a weakly basic solvent, more especially in an ether such as diethyl ether, diisopropyl ether, ethyl-butyl-ether, tetrahydorfuran, dioxane, glycol dimethyl ether, polyglycol dimethyl ether or similar solvents. If desired, these solvents may be diluted with other solvents such as hydrocarbons or halogenated hydrocarbons. The treatment with the hydrohalic acid may be carried out in an anhydrous or aqueous medium, but it is often of advantage to exclude water as far as possible.

The conversion of the 7-hydroxyl group into a sulfonyloxy group is carried out with a reactive derivative of an aliphatic or aromatic sulfonic acid, more especially with a halide thereof, for example with methanesulfonyl chloride, ethanesulfonyl chloride, para toluene sulfonyl chloride or the like. The esterification is performed in the presence of a tertiary base, for example pyridine, if necessary, with addition of an inert solvent, such as benzene, methylene chloride, dioxane or the like.

The elimination of the 7-sulfonyloxy group accompanied by formation of a 6:7 double bond is carried out with the use of a basic agent, for example with a tertiary base, such as collidine, pyridine or dimethylaniline, if desired, with the addition of an inert diluent. It is of special advantage to use dimethylformamide, diethyl formamide or dimethyl acetamide, either by itself or with the addition of a lithium halide such as lithium chloride or lithium bromide, or more especially with the addition of a carbonate of an alkali metal or alkaline metal such as lithium carbonate, calcium carbonate or strontium carbonate, or an alkali metal acylate such as sodium acetate, potassium acetate or the like. The elimination of the 7-sulfonyloxy group is carried out by heating the substance at an elevated temperature, advantageously ranging from 50 to 150° C.

As starting materials for use in the present process there are suitable $\Delta^{4:6}$-3-oxo-19-hydroxysteroids e.g. of the androstane, pregnane, cholane, cholestane, spirostane and cardanolide series which may contain in the ring system, more especially in one or several of the positions 1, 2, 4, 6, 7, 8, 9, 11, 12, 14, 15, 16, 20, 21, further substituents such as free or functionally converted oxo groups, esterified or etherified hydroxyl groups, alkyl (for example methyl) groups and/or halogen atoms. The term "functionally converted oxo groups" describes e.g. ketalized oxo groups or oxo groups converted into enol derivatives such as enolethers or enolesters. Furthermore, the starting materials may contain additional double bonds, for example in position 16 or 17 or in the side chain, or also oxido groups.

Particularly valuable starting materials are $\Delta^{4:6}$-3-oxo-19-hydroxy compounds of the androstane and pregnane series, for example:

$\Delta^{4:6}$-3:17-dioxo-19-hydroxyandrostadiene,
$\Delta^{4:6}$-3-oxo-17$\beta$:19-dihydroxyandrostadiene and its 17-esters, for example its acetate, propionate, trimethyl-acetate, phenylpropionate, decanoate, trifluoracetate and others,
$\Delta^{4:6}$-3-oxo-17$\beta$:19-dihydroxy-17$\alpha$-alkyl-, -17$\alpha$-alkenyl-, 17$\alpha$-alkinyl-androstadienes, more especially the 17$\alpha$-methyl, -17$\alpha$-ethyl, -17$\alpha$-isobutyl, -17$\alpha$-butyl, -17$\alpha$-allyl, -17$\alpha$-vinyl, -17$\alpha$-ethinyl, -17$\alpha$-(2-methyl)-ethinyl compounds and their esters; furthermore
$\Delta^{4:6}$-3:20-dioxo-19-hydroxypregnadiene,
$\Delta^{4:6}$-3:20-dioxo-6-chloro-19-hydroxypregnadiene,
$\Delta^{4:6}$-3:20-dioxo-17$\alpha$:19-dihydroxypregnadiene and its 17$\alpha$-esters, such as its acetate, propionate, butyrate, caproate, decanoate and the like, and alkyl ethers such, for example as its -17-methyl, 17-ethyl and -17-benzyl ether,
$\Delta^{4:6}$-3:20-dioxo-6-chloro- and -6-bromo-17$\alpha$:19-dihydroxypregnadiene and its 17$\alpha$-esters such as its acetate, propionate, caproate and the like,
$\Delta^{4:6}$-3:20-dioxo-17$\alpha$:21-diacyloxy-19-hydroxypregnadiene,
$\Delta^{4:6}$-3:20-dioxo-21-acyloxy-19-hydroxypregnadiene,
$\Delta^{4:6:16}$-3:20-dioxo-19-hydroxypregnatriene,
$\Delta^{4:6}$-3:20-dioxo-16$\alpha$:17$\alpha$-oxido-19-hydroxypregnadiene,
$\Delta^{4:6}$-3:20-dioxo-6-methyl-17$\alpha$:19-dihydroxypregnadiene and its esters,
$\Delta^{4:6}$-3:20-dioxo-6-chloro-16$\alpha$-methyl-17$\alpha$:19-dihydroxypregnadiene and others.

The compounds used as starting materials are advantageously manufactured by the processes described in Belgian Patents No. 606,179 granted January 15, 1962, to Ciba Société Anonyme, and No. 606,180, granted January 15, 1962, to Ciba Société Anonyme, and our co-pending application Ser. No. 208,610, filed July 9, 1962.

According to said processes a 3-oxygenated 19-unsubstituted 6$\beta$-hydroxysteroid is treated with a compound containing a monovalent positive halogen having an atomic weight over 19, or with an oxidizing metal acylate such, for example, as lead tetraacetate, the resulting 3-oxygenated 6$\beta$:19-oxidosteroid is converted in known manner into the corresponding $\Delta^4$-3-oxo-6$\beta$:19-oxidosteroid which is then converted with an acylating or etherifying agent in the presence of an acidic catalyst, if desired, by a following treatment with an acid or a base, into a $\Delta^{4:6}$-3-oxo-19-hydroxysteroid.

The present invention further includes $\Delta^{4:6}$-3:19-dioxosteroid dienes of the androstane and pregnane series, more especially $\Delta^{4:6}$-3:17:19-trioxoandrostadiene,
$\Delta^{4:6}$-3:19-dioxo-17$\beta$-hydroxyandrostadiene and its esters,
$\Delta^{4:6}$-3:19-dioxo-17$\beta$-hydroxy-17$\alpha$-alkyl-, -17$\alpha$-alkenyl-, -17$\alpha$-alkinyl-androstadienes, such as
$\Delta^{4:6}$-3:19-dioxo-17$\beta$-hydroxy-17$\alpha$-methyl-, -17$\alpha$-ethyl-, -17$\alpha$-isobutyl-, -17$\alpha$-butyl, -17$\alpha$-allyl-, -17$\alpha$-ethinyl-androstadiene and the corresponding 17-esters,
$\Delta^{4:6}$-3:19:20-trioxopregnadiene,
$\Delta^{4:6}$-3:19:20-trioxo-17$\alpha$-hydroxypregnadiene,
$\Delta^{4:6}$-3:19:20-trioxo-6-chloro- and -6-methylpregnadiene,
$\Delta^{4:6}$-3:19:20-trioxo-21-hydroxypregnadiene,
$\Delta^{4:6}$-3:19:20-trioxo-17:21-dihydroxypregnadiene,
$\Delta^{4:6}$-3:19:20-trioxo-6-chloro-16$\alpha$-methyl-17$\alpha$-hydroxypregnadiene, and their esters.

The invention further includes the $\Delta^{4:6}$-3-oxo-steroid-19-acids of the androstane and pregnane series and esters thereof such, for example, as $\Delta^{4:6}$-3:17-dioxoandrostadiene-19-acid,
$\Delta^{4:6}$-3-oxo-17$\beta$-hydroxyandrostadiene-19-acid,
$\Delta^{4:6}$-3-oxo-17$\beta$-hydroxy-17$\alpha$-methylandrostadiene-19-acid and their esters,
$\Delta^{4:6}$-3:20-dioxopregnadiene-19-acid,
$\Delta^{4:6}$-3:20-dioxo-17$\alpha$-hydroxypregnadiene-19-acid,
$\Delta^{4:6}$-3:20-dioxo-6-chloro-17$\alpha$-hydroxypregnadiene-19-acid and their esters.

The invention further includes $\Delta^{5(10):6}$-3-oxo-19-norsteroid dienes of the androstane and pregnane series, for example:

$\Delta^{5(10):6}$-3-oxo-17β-hydroxy-19-norandrostadiene,
$\Delta^{5(10):6}$-3-oxo-17β-hydroxy-17α-methyl-, -17α-ethyl-, -17α-vinyl- and -17α-ethinyl-19-norandrostadiene, as well as
$\Delta^{5(10):6}$-3:20-dioxo-19-norpregnadiene,
$\Delta^{5(10):6}$-3:20-dioxo-17α-hydroxy-19-norpregnadiene,
$\Delta^{5(10):6}$-3:20-dioxo-6-chloro-19-norpregnadiene,
$\Delta^{5(10):6}$-3:20-dioxo-6-chloro-16α-methyl-17α-hydroxy-19-norpregnadiene and similar products.

The invention includes also 21-unsubstituted $\Delta^{4:6}$-3:20-dioxo-19-norsteroid dienes of the pregnane series, which have a hydrogen atom or a hydroxyl group or acyloxy group in 17α-position and, if desired, are substituted in 4- or 6-position by a halogen atom, more especially:

$\Delta^{4:6}$-3:20-dioxo-19-norpregnadiene,
$\Delta^{4:6}$-3:20-dioxo-17α-hydroxy-19-norpregnadiene and its esters, e.g. the 17-acetate,
$\Delta^{4:6}$-3:20-dioxo-6-chloro-17α-hydroxy-19-norpregnadiene and its esters, e.g. the 17α-acetate,
$\Delta^{4:6}$-3:20-dioxo-4-chloro-17α-hydroxy-19-norpregnadiene and its esters, e.g. the 17α-acetate.

In the aforementioned esters the acid radicals are more especially those of aliphatic, cycloaliphatic, araliphatic, heterocyclic or aromatic carboxylic acids containing 1 to 15 carbon atoms, for example formates, acetates, propionates, butyrates, trimethylacetates, oenanthates, caproates, decanoates, cyclopentylpropionates, valerates, benzoates, furoates, hexahydrobenzoates, phenylpropionates, trifluoroacetates, ethylcarbonates, methylcarbonates and the like.

The conversion of the $\Delta^{4:6}$-3-oxo-19-norsteroid dienes into the corresponding $\Delta^{4}$-3-oxo-19-norsteroids can be carried out in known manner by partial hydrogenation of the dienone system by means of a palladium-strontium catalyst in ethyl acetate solution.

In the 19-nor-steroids of the present invention in which there are not present the groups typical for the physiologically active compounds, such as the 17β-hydroxy or 17-oxo groups of androstane compounds or the acetyl group of the above reported pregnane compounds, these groups can be formed in a manner known per se, e.g. a side chain in 17-position can be degraded to the 17-oxo group by oxidation.

The pharmacologically active 19-nor-steroids obtainable according to the present process can be used for the preparation of pharmaceutical preparations containing said active compound together with a solid or liquid medicinal excipient. Such pharmaceutical preparations are another aspect of the present invention. More particularly the preparations of the present invention, which can be used in human or veterinary medicine, are characterized by the content of one of the new $\Delta^{4:6}$-3:20-dioxo-19-nor-pregnadiene compounds, such as for instance the highly active progestational agent named above $\Delta^{4:6}$-3:20-dioxo-17α-acetoxy-19-nor-pregnadiene and the correseponding 6-chloro- or 4-chloro derivative or the $\Delta^{4:6}$-3:20-dioxo-17α-caproyloxy-19-nor pregnadiene. The preparations are made by as such known methods, for example, with the use of pharmaceutical organic or inorganic excipients, suitable for parenteral, enteral and particularly oral, or also topic administration. Suitable excipients are substances that do not react with the new compounds such, as for example, water, vegetable oils, benzyl alcohols, polyethylene glycols, gelatine, lactose, starch, magnesium stearate, talc, white petroleum jelly, chlosterol or other medicinal excipients. More especially preparations are made which are suitable for parenteral administration, preferably solutions, above all oily or aqueous solutions; furthermore suspensions, emulsions or implants; for enteral administration there are also made tablets or dragees, and for local administration also ointments or creams. If desired the preparations may be sterilized or they may contain assistants such as preserving, stabilizing, wetting or emulsifying agents, salts for regulating the osmotic pressure or buffers. They may also contain other therapeutically active compounds. They are prepared in the known manner. The content of the active substance in these preparations, such as of a tablet, is preferably 0.1–50 mg. or 0.03–60% by weight.

The following examples illustrate the invention.

*Example 1*

A solution of 2.0 grams of $\Delta^{4:6}$-3:17-dioxo-19-hydroxyandrostadiene in 50 cc. of pyridine is cooled to 0° C. and a solution of 4.8 grams of chromium trioxide in 46 cc. of water and 90 cc. of pyridine is stirred in. The reaction mixture is then stirred for 30 minutes at 60° C., cooled, poured into ice water and extracted with ether. The organic phase is successively washed with water, 2 N-sulfuric acid, sodium bicarbonate solution and water, dried with sodium sulfate and evaporated under vacuum, to yield 1.55 grams of yellowish $\Delta^{4:6}$-3:17:19-trioxoandrostadiene which, after one recrystallization from benzene, melts at 150 to 152° C. Optical rotation $$[\alpha]_D = +143.1°$$

(c.=0.8 in chloroform). $\lambda_{max}$=283 mμ ($\epsilon$=24600). The infra-red spectrum of the compound contains bands inter alia at 5.74, 5.80, 6.00, 6.16, 6.28, 7.25, 8.16, 8.27, 9.51, 9.87 and 11.36μ.

*Example 2*

A solution of 980 mg. of $\Delta^{4:6}$-3:17:19-trioxoandrostadiene in 50 cc. of acetone is reacted, while being stirred at 0° C. for 20 minutes, with 5 cc. of a solution of chromium trioxide in sulfuric acid (solution of 13.26 grams of chromium trioxide in 20 cc. of water and 11.5 cc. of concentrated sulfuric acid, made up with water to 50 cc.). The reaction mixture is treated with 50 grams of sodium acetate in 80 cc. of water and then extracted with benzene and the acid formed is washed out with saturated sodium bicarbonate solution. The basic washings are acidified, extracted with ether+methylene chloride, dried and evaporated, to yield 895 mg. of $\Delta^{4:6}$-3:17-dioxoandrostadiene-19-acid. The infra-red spectrum of the compound contains bands inter alia at 2.85, 5.76, 5.86, 5.93, 6.02, 6.20, 6.32, 7.30, 7.40, 8.16, 8.18, 9.17, 9.60, 9.88 and 11.32μ. $\lambda_{max}$: 284 mμ ($\epsilon$=22500).

*Example 3*

A solution of 2.5 grams of $\Delta^{4:6}$-3:17-dioxo-19-hydroxyandrostadiene in 125 cc. of acetone is cooled to 0° C., 12.5 cc. of the chromium trioxide+sulfuric acid solution prepared as described in Example 2 are added dropwise and the oxidation mixture is stirred for 40 minutes at 0 to 5° C. A solution of 125 grams of crystalline sodium acetate in 200 cc. of water is added and the mixture is extracted with benzene and then washed successively with semi-saturated sodium chloride solution and saturated sodium bicarbonate solution. The basic extracts are acidified with dilute sulfuric acid and extracted with ether+methylene chloride. The organic extract is dried and evaporated and yields 1.45 grams of the $\Delta^{4:6}$-3:17-dioxoandrostadiene-19-acid described in Example 2.

*Example 4*

A solution of 1.45 grams of crude $\Delta^{4:6}$-3:17-dioxoandrostadiene-19-acid in 20 cc. of methanol is mixed with 1.4 cc. of concentrated hydrochloric acid and the mixture is refluxed for 30 minutes, then cooled, diluted with 60 cc. of water, the methanol is evaporated under vacuum and the residue extracted with ether. The ethereal solution is washed with water and saturated sodium bicarbonate solution, dried with sodium sulfate and evaporated, to yield 1.02 grams of $\Delta^{4:6}$-3:17-dioxo-19-norandrostadiene. After recrystallization from methylene chloride+ether +petroleum ether the compound melts at 181 to 182° C. Optical rotation $[\alpha]_D = +58.3°$ (c.=0.76, in chloroform). $\lambda_{max}=282$ m$\mu$ ($\epsilon=26600$). The infra-red spectrum of the compound contains bands inter alia at 5.76, 6.03, 6.20, 6.35, 6.92, 7.30, 7.38, 7.55, 8.22, 8.95, 9.55, 9.92, 10.26, 10.80 and 11.27$\mu$.

*Example 5*

A solution of 1.2 grams of $\Delta^{4:6}$-3:20-dioxo-19-hydroxypregnadiene in 25 cc. of pyridine is treated with 2.0 grams of chromium trioxide in 10 cc. of water and 20 cc. of pyridine, and the mixture is stired for 4 hours at 25° C., then treated with water and extracted with ether. The ethereal layer is washed with water and with sodium bicarbonate solution, evaporated, and yields 970 mg. of crude $\Delta^{4:6}$-3:19:20-trioxopregnadiene which is purified by filtration through 15 times its own weight of alumina of activity II. $\lambda_{max}=283$ m$\mu$ ($\epsilon=24200$).

*Example 6*

A solution of 800 mg. of $\Delta^{4:6}$-3:20-dioxo-19-hydroxypregnadiene in 45 cc. of acetone is mixed at 0° C. with 5 cc. of the solution of chromium trioxide in sulfuric acid described in Example 2. After 30 minutes at the same temperature the reaction solution is diluted with 50 grams of sodium acetate in 80 cc. of water and then worked up as described in Examples 2 and 3. To decarboxylate the resulting $\Delta^{4:6}$-3:20-dioxo-pregnadiene-19-acid (615 mg.) it is dissolved in 10 cc. of methanol, mixed with 300 mg. of para-toluenesulfonic acid and refluxed, for 30 minutes. The cooled reaction mixture is diluted, extracted with ether, and the ethereal solution is washed until neutral, dried and evaporated, to yield 495 mg. of $\Delta^{4:6}$-3:20-dioxo-19-norpregnadiene.

*Example 7*

A solution of 50 mg. of $\Delta^{4:6}$-3:20-dioxo-17$\alpha$-acetoxy-19-hydroxypregnadiene in 5 cc. of pyridine is added to a freshly prepared suspension of pyridine+chromium trioxide complex from 250 mg. of chromium trioxide and 5 cc. of pyridine. Atfer 12 hours at room temperature the solvent is distilled off in a high vacuum and the residue is extracted with benzene, the extract is filtered through alumina of activity II, and yields 35 mg. of $\Delta^{4:6}$-3:19:20-trioxo-17$\alpha$-acetoxypregnadiene.

*Example 8*

A solution of 470 mg. of $\Delta^{4:6}$-3:20-dioxo-17$\alpha$-acetoxy-19-hydroxypregnadiene in 28 cc. of acetone is mixed at 0° C. with 2.8 cc. of the solution of chromium trioxide in sulfuric acid described in Example 2. After one hour at the same temperature a solution of 28 grams of sodium acetate in 45 cc. of water is aded and the reaction solution is extracted with benzene. The extract is then separated into neutral and acidic phases by agitation with sodium bicarbonate solution while cooling with ice; the basic extracts are acidified with dilute sulfuric acid and extracted with ether methylene chloride. The extracts are dried and evaporated and yield 280 mg. of $\Delta^{4:6}$-3:20-dioxo-17$\alpha$-acetoxypregnadiene-19-acid, 137 mg. of starting material being recovered. The infra-red spectrum of the compound contains absorption bands inter alia at 2.86, 5.77, 6.03, 6.19, 6.30, 7.30, 7.40, 8.14, 8.95, 9.20, 9.54, 10.26 and 11.30$\mu$. When the compound is slowly heated it is converted—with elimination of carbon dioxide — into the $\Delta^{5(10):6}$-3:20-dioxo-17$\alpha$-acetoxy-19-norpregnadiene described in Example 15. On a bath preheated to 140° C. the compound melts with violent decomposition.

*Example 9*

A solution of 230 mg. of $\Delta^{4:6}$-3:20-dioxo-17$\alpha$-acetoxypregnadiene-19-acid in 4 cc. of tertiary butanol is mixed with 0.15 cc. of concentrated hydrochloric acid, and the mixture is refluxed for 20 minutes in a bath previously heated to 110° C. The mixture is then allowed to cool, diluted with benzene and washed with water and with sodium bicarbonate solution, dried and evaporated, to yield 169 mg. of $\Delta^{4:6}$-3:20-dioxo-17$\alpha$-acetoxy-19-norpregnadiene; after recrystallization from methylene chloride+petroleum ether it melts at 237 to 239° C. The infra-red spectrum of the compound contains absorption bands at 5:76, 5.83, 6.01, 6.20, 6.30, 7.30, 8.05, 8.15, 8.25, 8.90, 9.20, 9.50, 9.80, 10.28 and 11.25$\mu$.

*Example 10*

1.00 gram of $\Delta^{4:6}$-3-oxo-17$\beta$-($\beta$-phenylpropionyloxy)-19-hydroxyandrostadiene in 50 cc. of acetone is oxidized with 5 cc. of the chromium trioxide+sulfuric acid solution described in Example 2. Conventional working up of the batch yields 860 mg. of $\Delta^{4:6}$-3-oxo-17$\beta$-($\beta$-phenylpropionyloxy)-androstadiene-19-acid which is dissolved in 10 cc. of tertiary butanol, treated with 0.5 cc. of concentrated hydrochloric acid, refluxed for 15 minutes and then worked up to yield 530 mg. of $\Delta^{4:6}$-3-oxo-17$\beta$-($\beta$-phenylpropionyloxy)-19-norandrostadiene.

*Example 11*

12.8 grams of $\Delta^{4:6}$-3:20-dioxo-17$\alpha$-caproyloxy-19-hydroxypregnadiene are dissolved in 400 cc. of acetone, mixed at 0° C. with 40.0 cc. of the solution of chromium trioxide in sulfuric acid (described in Example 2) and the whole is stirred for 20 minutes at 0 to 5° C. The reaction mixture is then poured into 1 liter of water, agitated with chloroform, and the combined chloroform extracts are washed with 5 x 100 cc. of saturated sodium bicarbonate solution. The acid is precipitated from the basic aqueous solution with 2 N-sulfuric acid in crystalline form, filtered off, washed with water until the washings run neutral, and dried. One reprecipitation from methylene chloride+ether yields 10.2 grams of pure $\Delta^{4:6}$-3:20-dioxo-17$\alpha$-caproyloxypregnadiene-19-acid melting at 156–157° C. with decomposition. The infra-red spectrum of the compound contains absorption bands, inter alia, at 2.90, 5.76, 5.87 (shoulder), 6.02, 6.16, 6.28, 7.40, 8.15, 8.60, 8.96, 9.55 and 11.35$\mu$.

The $\Delta^{4:6}$-3:20-dioxo-17$\alpha$-caproyloxy-19-hydroxypregnadiene used as starting material (melting at 148° C.; optical rotation $[\alpha]_D^{25}=-15°$ [c.=1.155]) is obtained by reacting $\Delta^4$-3:20-dioxo-6$\beta$:19-oxidopregnene with acetic anhydride and para-toluenesulfonic acid, followed by partial hydrolysis of the 19-acetate.

*Example 12*

A solution of 10.0 grams of $\Delta^{4:6}$-3:20-dioxo-17$\alpha$-caproyloxypregnadiene-19-acid in 50 cc. of glacial acetic acid is refluxed for 15 minutes on a bath preheated at 145° C. 100 cc. of benzene are then added and the solvent is evaporated under vacuum, the residue is taken up in ether, washed successively with water, sodium bicarbonate solution and water, dried, and the solution is evaporated under vacuum. Yield: 9.25 grams of a crystalline crude product which, after a short filtration through alumina and subsequent crystallization from ether+petroleum ether, yields 8.15 grams of pure $\Delta^{4:6}$-3:20-dioxo-17$\alpha$-caproyloxy-19-norpregnadiene melting at 124° C. Optical rotation $[\alpha]_D^{25}=-71.7°$ (c.=1.042). The infra-red spectrum of the compound contains bands, inter alia, at 5.77, 6.01, 6.17, 6.29, 7.36, 8.26, 8.55, 9.56, 10.31 and 11.31$\mu$. Absorption maximum in the ultra-violet spectrum at 283 m$\mu$ ($\epsilon=27,600$).

*Example 13*

A solution of 1.50 grams of crude $\Delta^{4:6}$-3:20-dioxo-17$\alpha$-acetoxypregnadiene-19-acid in 10 cc. of pyridine is heated for 40 minutes at 75° C. The pyridine is then distilled off under a high vacuum, the residue is taken up in ether and the solution is washed with water and sodium bicarbonate solution until the washings run neutral, dried and evaporated under vacuum. The resulting neutral crude product (1.05 grams) is dissolved in benzene and chromatographed on silica gel. A 9:1-mixture of benzene and ethyl acetate elutes 460 mg. of $\Delta^{5(10):6}$-3:20-dioxo-17α-acetoxy-19-norpregnadiene which, after recrystallization from methylene chloride+ether+petroleum ether, melts at 163–165° C. Optical rotation $[\alpha]_D^{25}$=161.4° (c.=0.853). Ultra-violet spectrum: maximum at 268 mμ (ε=4800).

The nuclear resonance signals at 358, 348, 338, 177, 155, 127, 123.7 and 40.6 cycles (measured in deutero chloroform at 60 megacycles and referred to tetramethyl silane) are in accordance with the constitution of the product. The infra-red spectrum contains absorption bands, inter alia, at 5.80, 5.86, 7.35, 8.10, 9.20, 9.31, 9.62 and 10.45μ.

A 4:1-mixture of benzene and ethyl acetate elutes 230 mg. of $\Delta^{4:6}$-3:20-dioxo-17α-acetoxy-19-norpregnadiene melting at 227–229° C. which is in every respect identical with the product obtained in Example 9.

The identical compound is also obtained by short heating of a mixture of 500 mg. of the $\Delta^{5(10):6}$-3:20-dioxo-17α-acetoxy-19-norpregnadiene described above and 5 cc. of acetic acid of 66% strength, or even when said pregnadiene is simply chromatographed on alumina.

Example 14

A solution of 520 mg. of $\Delta^{4:6}$-3-oxo-17β-acetoxy-androstadiene-19-acid in 15 cc. of toluene is refluxed for 30 minutes. The cooled solution is diluted with 100 cc. of ether, washed with sodium bicarbonate solution and water until the washings run neutral, dried with sodium sulfate and evaporated under vacuum. The resulting crude product (425 mg.) yields on chromatography on silica gel 115 mg. of a foam which, on crystallization from ether+petroleum ether, furnishes pure $\Delta^{5(10):6}$-3-oxo-17β-acetoxy-19-norandrostadiene; its ultra-violet spectrum contains a maximum at 266 mμ (ε=4600). When the latter compound is heated with acetic acid, or chromatographed on alumina, it is isomerized to $\Delta^{4:6}$-3-oxo-17β-acetoxy-19-norandrostadiene.

The $\Delta^{4:6}$-3-oxo-17β-acetoxyandrostadiene-19-acid used as starting material is obtained from 19-hydroxytestosterone acetate by dehydrogenation to the corresponding $\Delta^{4:6}$-dienone and subsequent oxidation to the 19-acid.

Example 15

The following pharmaceutical perparation is for example made in a manner known per se:

Tablet for oral administration containing $\Delta^{4:6}$-3:20-dioxo-17α-acetoxy-19-nor-pregnadiene—

| | Milligrams |
|---|---|
| $\Delta^{4:6}$-3:20-dioxo-17α-acetoxy-19-nor-pregnadiene | 1.00 |
| Lactose | 53.00 |
| Gelatine | 1.00 |
| Wheat starch | 39.50 |
| Magnesium stearate | 0.30 |
| Talc | 5.20 |
| | 100.00 |

Example 16

370 mg. of $\Delta^{4:6}$-3:20-dioxo-17α-acetoxy-19-norpregnadiene are dissolved in 3 ml. of dioxane, mixed with 2.3 ml. of a 0.88 N-solution of chlorine in propionic acid and kept first at −30° C. for seven hours and then at 5° C. for 12 hours. Water is then added and the reaction mixture extracted with ether and worked up as usual. There are obtained 412 mg. of a slightly colored crude product. When this product is recrystallized twice from a mixture of methylene chloride and petroleum ether there or botained 360 mg. of the pure $\Delta^{4:6}$-dioxo-4-chloro-17α-acetoxy-19-nor pregnadiene which melts at 203–205° and shows in the IR-spectrum inter alia the following bands: 5.79, 5.84, 5.97, 6.23, 6.46, 8.32, 8.98, 9.57 and 12.24μ.

Example 17

A solution of 100 mg. of $\Delta^4$-3-oxo-6α:7α-oxido-17α-methyl-17β-acetoxy-19-norandrostene in 5 ml. of N-hydrochloric acid in dioxane is kept for 75 hours at room temperature, then poured into dilute sodium bicarbonate solution, and the whole is twice extracted with methylene chloride. The solutions are washed with water, dried and evaporated under vacuum, and the residue is chromatographed on 3 grams of alumina (activity II). The crystalline fractions eluted with benzene are recrystallized from methylene chloride+ether and yield 25 mg. of $\Delta^{4:6}$-3-oxo-6-chloro-17α-methyl - 17β - acetoxy - 19 - norandrostadiene which, after recrystallization, melts at 225–226.5° C. with decomposition. Ultra-violet spectrum in absolute alcohol: maximum at 284 mμ (ε=22800). Infra-red spectrum in methylene chloride: Bands inter alia at 5.77μ (acetate), 5.98+6.21+6.29μ ($\Delta^{4:6}$-3-ketone) and 8.12μ (acetate).

The $\Delta^4$-3-oxo-6α:7α-oxido-17α-methyl-17β-acetoxy-19-norandrostene used as starting material is prepared as follows:

A solution of 60 grams of $\Delta^4$-3-oxo-17α-methyl-17β-acteoxy-19-norandrostene in 1 liter of dioxane and 120 ml. of orthoformic acid ethyl ester is mixed with a solution of 3 grams of para-toluenesulfonic acid in 480 ml. of dioxane. The mixture is kept for 2¾ hours at room temperature, 50 ml. of pyridine are added, and the whole is concentrated in vacuum until crystallization sets in, mixed with benzene and twice washed with water. The aqueous solutions are once more extracted with benzene. The benzene solutions are dried and evaporated in vacuum, and the residue is dissolved in xylene, the solution is again evaporated in vacuum, and this operation is repeated twice more. The resulting crude $\Delta^{3:5}$-3-ethoxy - 17α - methyl-17β-acetoxy-19-norandrostadiene is dissolved in 2.4 liters of acetone, and a solution of 45 grams of sodium acetate in 300 ml. of water and then, at 3° C., 66 grams of bromosuccinimide and 51 ml. of glacial acetic acid are stirred in. The whole is stirred for 3 hours while being cooled with ice, whereupon a solution of 60 grams of potassium iodide in 200 ml. of water and then a solution of 120 grams of potassium thiosulfate in 250 ml. of water are run in. The acetone is then evaporated under vacuum, and the residue is extracted three times with methylene chloride. The organic solutions are washed with sodium bicarbonate solution and then with water, dried, and evaporated under vacuum. The crude $\Delta^4$-3-oxo-6-bromo-17α-methyl-17β-acetoxy-19-norandrostene is mixed with 750 ml. of dimethyl formamide and 50 grams of calcium carbonate; the whole is boiled under nitrogen with stirring for 45 minutes, then allowed to cool, filtered, the filter residue is rinsed with 1 liter of alcohol, and the filtrate is mixed with a solution of 20 grams of sodium acetate in 15 ml. of water and evaporated under vacuum. Xylene is added to the residue, the mixture is filtered and rinsed with xylene, evaporated under vacuum, and the residue is dissolved in benzene, again evaporated under vacuum and the residue is chromatographed on 2 kg. of alumina (activity II). The crystalline fractions eluted with a 4:1-mixture of benzene and petroleum ether and the first fractions eluted with a 1:1 mixture of benzene and petroleum ether yield on recrystallization from petroleum ether 14.4 grams of $\Delta^4$-3-oxo-17α-methyl-17β-acetoxy - 19 - norandrostene melting at 94–95° C. The following fractions eluted with a 1:1-mixture of benzene and petroleum ether and the fractions eluted with plain benzene yield $\Delta^{4:6}$-3-oxo-17α-methyl-17β-acetoxy-19-norandrostadiene which, after recrystallization from ether+petroleum ether, is obtained in a yield of 21.5 grams and melts at 183.5–185.5° C. On further recrystallization the melting point rises to 188.5–189.5° C. Ultra-violet spectrum in absolute alcohol: maximum at 283 mμ (ε=26,200). Optical rotation $[\alpha]_D^{25}$=−17° (c.=1.024 in chloroform). Infra-red spectrum in methylene chloride: Bands at $5.77\mu$ (acetate), $6.00+6.16+6.29\mu$ ($\Delta^{4:6}$-3-ketone) and $8.10\mu$ (acetate).

A solution of 20.6 grams of $\Delta^{4:6}$-3-oxo-17α-methyl-17β-acetoxy-19-norandrostadiene in 2 liters of methylene chloride is cooled to 5° C., then mixed with 400 ml. of a 1.56 N-solution of monoperphthalic acid in ether, left to itself for 21 hours at room temperature, and while cooling with ice 800 ml. of 2 N-sodium carbonate solution are then stirred in. 15 minutes later the whole is flushed with methylene chloride into a separating funnel and successively agitated with 500 ml. of 2 N-sodium carbonate solution; then with a solution of 60 grams of potassium iodide and 3 ml. of glacial acetic acid in 600 ml. of water; then, without previous isolation, with a solution of 60 grams of sodium thiosulfate in water; then twice with 500 ml. of 2 N-sodium carbonate solution on each occasion; finally twice with dilute sodium chloride solution. The aqueous solutions are extracted twice more with methylene chloride, and the organic solutions are dried and evaporated under vacuum. The residue is dissolved in benzene and filtered through 10 grams of alumina (activity II) and rinsed with benzene. When the residue is recrystallized from methylene chloride+ether with the use of 1 gram of Carboraffin, there are obtained 9.4 grams of $\Delta^4$-3-oxo-6α:7α-oxido-17α-methyl-17β-acetoxy-19-norandrostene which, after further recrystallization, melts at 168–169° C. Chromatography of the first mother liquor on 300 grams of alumina (activity II) yields another 260 mg. of the above oxido compound. Optical rotation $[\alpha]_D^{25}=+26°$ (c.=0.918 in chloroform). Ultra-violet spectrum in absolute alcohol: maximum at 241 m$\mu$ ($\epsilon$=15,300). Infra-red spectrum in methylene chloride: Bands at $5.77+8.09\mu$ (acetate) and $5.94+6.14\mu$ ($\Delta^4$-3-ketone).

*Example 18*

A solution of 9.25 grams of $\Delta^4$-3-oxo-6α:7α-oxido-17α-methyl-17β-acetoxy-19-norandrostene in 450 ml. of N-hydrochloric acid in dioxane is kept for 30 minutes at room temperature and then poured into 3 liters of a sodium bicarbonate solution of 2.5% strength. The whole is agitated three times with methylene chloride, and the organic solutions are washed once with water, dried and evaporated under vacuum. The residuum of dioxane is removed under a high vacuum. The resulting crude $\Delta^4$-3-oxo-6β-chloro-7α-hydroxy-17α-methyl-17β-acetoxy-19-norandrostene is dissolved in 100 ml. of pyridine and, while being stirred and cooled with a mixture of ice and common salt, mixed with 10 ml. of methanesulfonyl chloride. The whole is left to itself for 64 hours at −10° C., then stirred into dilute sodium bicarbonate solution, 5 minutes later extracted with methylene chloride, and washed with saturated sodium bicarbonate solution and water. The organic solution is dried and evaporated under vacuum at 30° C., and the residue is dried under a high vacuum. The resulting crude $\Delta^4$-3-oxo-6β-chloro-7α-mesyloxy-17α-methyl-17β-acetoxy-19-norandrostene is mixed with 600 ml. of dimethyl formamide and 100 grams of anhydrous sodium acetate, heated with stirring for 1 hour at 80° C. under nitrogen, and then kept for 60 hours at room temperature. Water is added, the whole is agitated three times with methylene chloride, and the organic solutions are washed with water, dried, and evaporated, first in a water-jet vacuum and then under a high vacuum. The crystalline yellowish residue is dissolved in benzene and filtered through 500 grams of alumina (activity II) and rinsed with benzene. The eluate is evaporated under vacuum and the residue is recrystallized from methylene chloride+ether, to yield 7.18 grams of the $\Delta^{4:6}$-3-oxo-6-chloro-17α-methyl-17β-acetoxy-19-norandrostadiene described in Example 1. Optical rotation $[\alpha]_D^{25}=-3°$ (c.=0.973 in chloroform).

A solution of 50 mg. of $\Delta^{4:6}$-3-oxo-6-chloro-17α-methyl-17β-acetoxy-19-norpregnadiene in 1 ml. of absolute tetrahydrofuran is mixed with 1 ml. of an 0.94-molar solution of lithium aluminum hydride in tetrahydrofuran. After 30 minutes, the mixture is poured into ice and Seignette salt solution, extracted three times with methylene chloride, and the organic solutions are washed with water, dried and evaporated in a water-jet vacuum. The residue (38.5 mg.) is mixed with 15 ml. of benzene, 1.2 ml. of acetone and 300 mg. of aluminum-tertiary butylate and heated for 14 hours at 32° C. The reaction mixture is then poured into Seignette salt solution, extracted three times with benzene, and the organic solutions are washed with Seignette salt solution and water. The benzene solutions are dried and evaporated in a water-jet vacuum, and the residue is chromatographed on 1 gram of alumina (activity II). Crystallization from ether of the first fractions eluted with a 9:1-mixture of benzene and ethyl acetate yields 6 mg. of $\Delta^{4:6}$-3-oxo-6-chloro-17α-methyl-17β-hydroxy-19-norpregnadiene melting at 164–172° C. Infra-red spectrum in methylene chloride: Bands inter alia at $2.78\mu$ (hydroxyl) and $5.99+6.22+6.30\mu$ ($\Delta^{4:6}$-3-ketone).

*Example 19*

A solution of 250 mg. of $\Delta^4$-3:20-dioxo-6α:7α-oxido-17α-acetoxy-19-norpregnene in 15 ml. of N-hydrochloric acid in dioxane is kept for ½ hour at 25° C. then poured into water and neutralized with sodium bicarbonate solution. The precipitated crude product is taken up in a 5:1-mixture of ether and methylene chloride, washed with water until the washings run neutral, and the solution is dried and evaporated under vacuum. The crude $\Delta^4$-3:20-dioxo-6β-chloro-7α-hydroxy-17α-acetoxy-19-norpregnene is dissolved as it is in 3 ml. of pyridine, mixed at −5 to 0° C. with 0.3 ml. of methanesulfonyl chloride while being stirred, and the mixture is kept for 2 days at −10° C. The reaction product is then poured into dilute sodium bicarbonate solution, taken up in ether, and the ethereal solution is washed until the washings run neutral, dried and evaporated under vacuum. The resulting $\Delta^4$-3:20-dioxo-6β-chloro-7α-mesyloxy-17α-acetoxy-19-norpregnene is dissolved in 25 ml. of dimethyl formamide, mixed with 4.5 grams of anhydrous sodium acetate, and the whole is heated for 75 minutes at 85° C. under nitrogen while being stirred. The cooled reaction mixture is diluted with water, extracted with a 5:1-mixture of ether and methylene chloride, and the organic layer is washed with 5 x 100 ml. of water, dried and evaporated. The resulting crude product is dissolved in benzene and chromatographed on 15 times its own weight of alumina (activity II). The afore-mentioned solvent elutes 105 mg. of pure $\Delta^{4:6}$-3:20-dioxo-6-chloro-17α-acetoxy-19-nor-pregnadiene which is recrystallized from methylene chloride+hexane. The infra-red spectrum contains absorption bands inter alia at 5.78, 5.85, 6.02, 6.22, 6.31 and $8.10\mu$. Ultra-violet absorption maximum at 284 m$\mu$ ($\epsilon$=24,100). Melting point 159–161° C.

The $\Delta^4$-3:20-dioxo-6α:7α-oxido-17α-acetoxy-19-norpregnadiene used as starting material (melting point 230–231° C.) UV-spectrum $\lambda_{max}$ 241 m$\mu$ $\epsilon$=15,700 and 320 m$\mu$ $\epsilon$= 1,550 may be obtained from $\Delta^{4:6}$-3:20-dioxo-17α-acetoxy-19-nor-pregnadiene by treatment with perphthalic acid according to the directions given in Example 17.

What is claimed is:
1. $\Delta^{4:6}$-3:20-dioxo-17α-acetoxy-19-nor-pregnadiene.
2. 17-oxygenated $\Delta^{4:6}$-3:19-dioxo-androstadiene.
3. $\Delta^{4:6}$-3:19:20-trioxo-pregnadiene.
4. $\Delta^{4:6}$-3:19:20-trioxo-17-acetoxypregnadiene.
5. 17-oxygenated-$\Delta^{4:6}$-3-oxoandrostane-19-acid.
6. $\Delta^{4:6}$-3:20-dioxo-pregnadiene-19-acid.
7. $\Delta^{4:6}$-3:20-dioxo-17-acetoxy-pregnadiene-19-acid.
8. $\Delta^{4:6}$-3:20-dioxo-17-caproyloxy-pregnadiene-19-acid.
9. $\Delta^{5(10):6}$-3:20-dioxo-19-nor-pregnadiene.
10. $\Delta^{5(10):6}$-3:20-dioxo-17α-acetoxy-19-nor-pregnadiene.
11. $\Delta^{4:6}$-3:20-dioxo-17α-caproyloxy-19-nor-pregnadiene.

12. 17- and 21-unsubstituted $\Delta^{4:6}$-3:20-dioxo-19-nor-pregnadiene containing in the 4- and 6-position a member selected from the group consisting of a hydrogen and halogen atom.

13. Esters of $\Delta^{4:6}$ - 3:20 - dioxo - 17α - hydroxy-19-nor-pregnadiene derived from carboxylic acids having up to 15 carbon atoms.

14. A member selected from the group consisting of 17-oxygenated $\Delta^{5(10):6}$-3-oxo-19-nor-androstadiene and its esters of carboxylic acids having up to 15 carbon atoms.

References Cited by the Examiner

UNITED STATES PATENTS

| | | | |
|---|---|---|---|
| 2,739,974 | 3/1956 | Colton | 260—397.3 |
| 2,998,434 | 8/1961 | Ringold et al. | 260—397.4 |
| 3,014,931 | 12/1961 | Nishikawa et al. | 260—397.1 |
| 3,066,155 | 11/1962 | Knox | 260—397.3 |

OTHER REFERENCES

Ringold et al.: JACS (1959), pages 3485–3486.

LEWIS GOTTS, *Primary Examiner.*

Notice of Adverse Decision in Interference

In Interference No. 95,719 involving Patent No. 3,250,792, A. Wettstein, G. Anner, K. Heusler, J. Kalvoda and P. Wieland, 19-NOR-STEROIDS AND PROCESS FOR THEIR MANUFACTURE, final judgment adverse to the patentees was rendered Oct. 25, 1968, as to claims 1, 11 and 13.

[*Official Gazette June 3, 1969.*]

Disclaimer 3,250,792.—*Albert Wettstein*, Riehen, and *Georg Anner, Karl Heusler, Jaroslav Kalvoda,* and *Peter Wieland*, Basel, Switzerland. 19-NOR-STEROIDS AND PROCESS FOR THEIR MANUFACTURE. Patent dated May 10, 1966. Disclaimer filed July 10, 1969, by the assignee, *Ciba Corporation.*

Hereby enters this disclaimer to claims 1, 11 and 13 of said patent.

[*Official Gazette August 26, 1969.*]